No. 735,553. PATENTED AUG. 4, 1903.
L. A. MILLER.
SAD IRON.
APPLICATION FILED JULY 22, 1902.
NO MODEL.
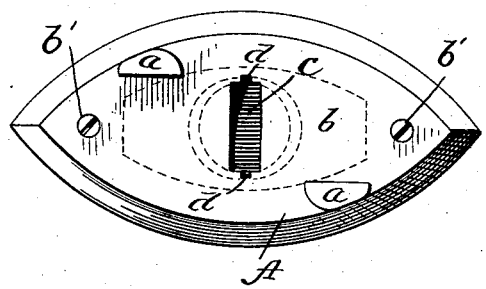
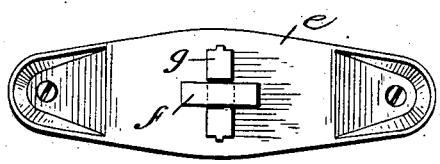
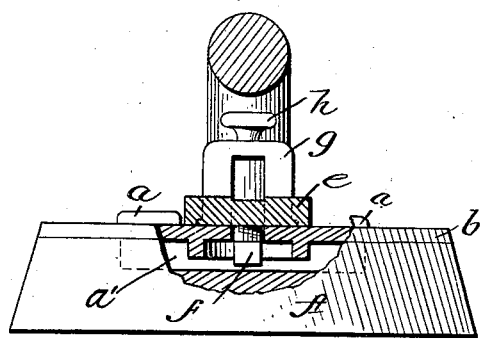
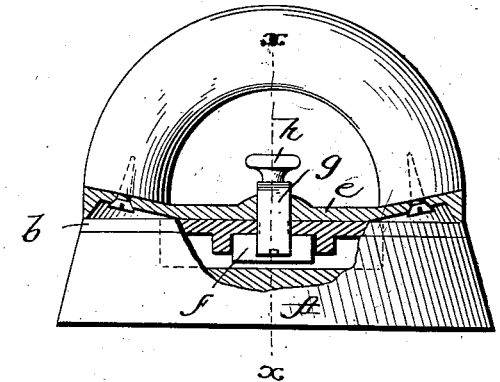
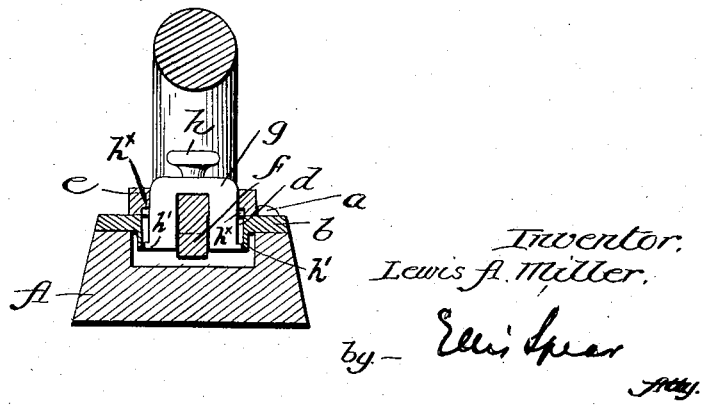
Attest:
C. D. Middleton
Edw. L. Reed
Inventor:
Lewis A. Miller
by Ellis Spear
Atty.

No. 735,553. Patented August 4, 1903.

UNITED STATES PATENT OFFICE.

LEWIS A. MILLER, OF JERSEYVILLE, ILLINOIS.

SAD-IRON.

SPECIFICATION forming part of Letters Patent No. 735,553, dated August 4, 1903.

Application filed July 22, 1902. Serial No. 116,520. (No model.)

*To all whom it may concern:*

Be it known that I, LEWIS A. MILLER, a citizen of the United States, residing at Jerseyville, Illinois, have invented certain new and useful Improvements in Sad-Irons, of which the following is a specification.

My invention relates to sad-irons, especially relating to the construction of the parts adapted to permit of the ready removal of the handle.

The object of my invention is to simplify the construction and reduce the number of parts and at the same time make these parts of such shape and relative arrangement as to make a perfect connection not liable to get out of order.

In the drawings, Figure 1 represents the base of the iron. Fig. 2 is a bottom view of the handle part. Fig. 3 represents the parts in one position before connection. Fig. 4 represents the parts after being connected. Fig. 5 is a vertical section on line $x\,x$, Fig. 4.

The base is shown at A and on its upper face is provided with the lugs $a$ against which the base of the handle bears, thus limiting the movement of the handle part in one direction.

The upper plate $b$ is provided with a transversely-extending slot $c$, open into a recess beneath the plate $b$, this slot having grooves in its end walls, as at $d$. The handle-base $e$ has rigidly secured to its under face, centrally thereof, an inverted-T-shaped projection $f$. This is adapted when the handle part is placed at right angles to the base to enter the slot $c$ in the plate $b$, and then by giving the handle part a quarter-turn the ends of the T-head pass under the edges of the plate $b$ bordering on the slot, and this holds the parts together against separating movement vertically. It is necessary, however, to prevent the turning of the handle in the direction unopposed by the stops $a$, and this I do by a locking gravity-catch carried by the base-plate of the handle and consisting of a U-shape part $g$, having a handle $h$, the limbs of the U being located on each side of the shank of the T-shape head. It will thus be seen that after the connection has been made between the handle and the base the locking-catch may be allowed to drop, and it will find a space between the walls of the T-head and the outer walls of the slot $c$ in the plate $b$, and by filling this space the handle part will be prevented from turning. No springs are used, nor are they necessary. The gravity-catch is prevented from becoming displaced by projections $h'$, extending beyond the walls of the slots in the handle-base. The grooves $d$ in the base-plate allow the passage of these projections. When the gravity-catch is drawn up, the projections enter recesses $h^\times$ in the under face of the handle part, and thus the ends of the gravity-catch come flush with the under face of the handle-plate.

It will be observed that my improved construction is exceedingly simple, of very few parts, and capable of use by unskilled persons.

Plate $b$ is removably secured to the body of the iron by screws $b'$, the said plate fitting over a recess $a'$ in the body of the iron. By my construction the locking of the handle to the iron is effected by the engagement of the T-shaped projection and the U-shaped locking-piece with the said top plate $b$. It will be noticed that the U-shaped locking-piece fits snugly on each side of the T-shaped projection and it, together with the stem of the T-shaped projection, completely fills the cross-slot in the top plate, so that when the parts are locked there is no play or looseness, but the iron presents a substantially solid structure, so that in use there is no liability of the handle to slip loose in pushing the iron back and forth over the board. The end of the cross-slot, as before stated, has grooves to allow the projections $h'$ to pass, and the bottom of the handle has the recesses $h^\times$ to receive these projections, so that the ends of the limbs of the U-shaped locking devices will be flush with the under face of the bottom of the handle when the locking device is drawn up.

What I claim is—

In combination with the iron having a transverse slot with grooves at the ends, a handle portion having a T-shaped projection and U-shaped locking device, the said locking device having projections to prevent its removal, said projections being adapted to
5 pass through the grooves at the ends of the slot, and the bottom of the handle having recesses to receive the projections.

In testimony whereof I affix my signature in presence of two witnesses.

LEWIS A. MILLER.

Witnesses:
F. H. BAYER,
HENRY T. WITT.